(12) United States Patent
Dierks et al.

(10) Patent No.: US 9,663,146 B1
(45) Date of Patent: May 30, 2017

(54) OUTRIGGER PLANK SPLICE SUPPORT

(71) Applicants: Dale J. Dierks, Mitchell, SD (US); Brent A. Hohman, Fulton, SD (US); Steven R. Kennedy, Mitchell, SD (US); Scott A. Sievert, Mitchell, SD (US)

(72) Inventors: Dale J. Dierks, Mitchell, SD (US); Brent A. Hohman, Fulton, SD (US); Steven R. Kennedy, Mitchell, SD (US); Scott A. Sievert, Mitchell, SD (US)

(73) Assignee: DAKOTA MANUFACTURING COMPANY, INC., Mitchell, SD (US)

( * ) Notice: Subject to any disclaimer, the term of this patent is extended or adjusted under 35 U.S.C. 154(b) by 0 days.

(21) Appl. No.: 15/188,470

(22) Filed: Jun. 21, 2016

(51) Int. Cl.
*B62D 21/14* (2006.01)

(52) U.S. Cl.
CPC .................................... *B62D 21/14* (2013.01)

(58) Field of Classification Search
CPC ...................................................... B62D 21/14
USPC ................ 296/184.1, 26.12, 26.15; 280/656; 105/372, 393
See application file for complete search history.

(56) References Cited

U.S. PATENT DOCUMENTS

| | | | | |
|---|---|---|---|---|
| 905,026 | A * | 11/1908 | Tritoh et al. | A47B 1/04 108/78 |
| 1,831,441 | A * | 11/1931 | Davis | B62D 53/062 280/656 |
| 2,717,802 | A | 9/1955 | Martin | |
| 3,831,774 | A * | 8/1974 | Moore | E02F 9/085 248/357 |
| 4,015,858 | A * | 4/1977 | Love | B62D 53/067 280/656 |
| 4,311,322 | A * | 1/1982 | Verros | B60P 3/064 105/372 |
| 4,397,498 | A * | 8/1983 | Joynt | B62D 33/02 108/78 |
| 4,943,106 | A | 7/1990 | Hunt | |
| 5,924,754 | A * | 7/1999 | Kuhns | B62D 21/14 296/184.1 |
| 6,612,601 | B1 * | 9/2003 | Granlind | B60P 3/1091 280/414.1 |
| 7,185,933 | B2 * | 3/2007 | Goransson | B62D 21/03 296/203.01 |

* cited by examiner

*Primary Examiner* — Dennis H Pedder
(74) *Attorney, Agent, or Firm* — Dennis L. Thomte; Thomte Patent Law Office LLC

(57) ABSTRACT

An outrigger plank splice support which is selectively removably attached to an outrigger which extends transversely outwardly from a trailer. The outrigger plank splice support includes an upper horizontally disposed plank support member which has a greater width than the width of the upper end member of the outrigger.

4 Claims, 10 Drawing Sheets

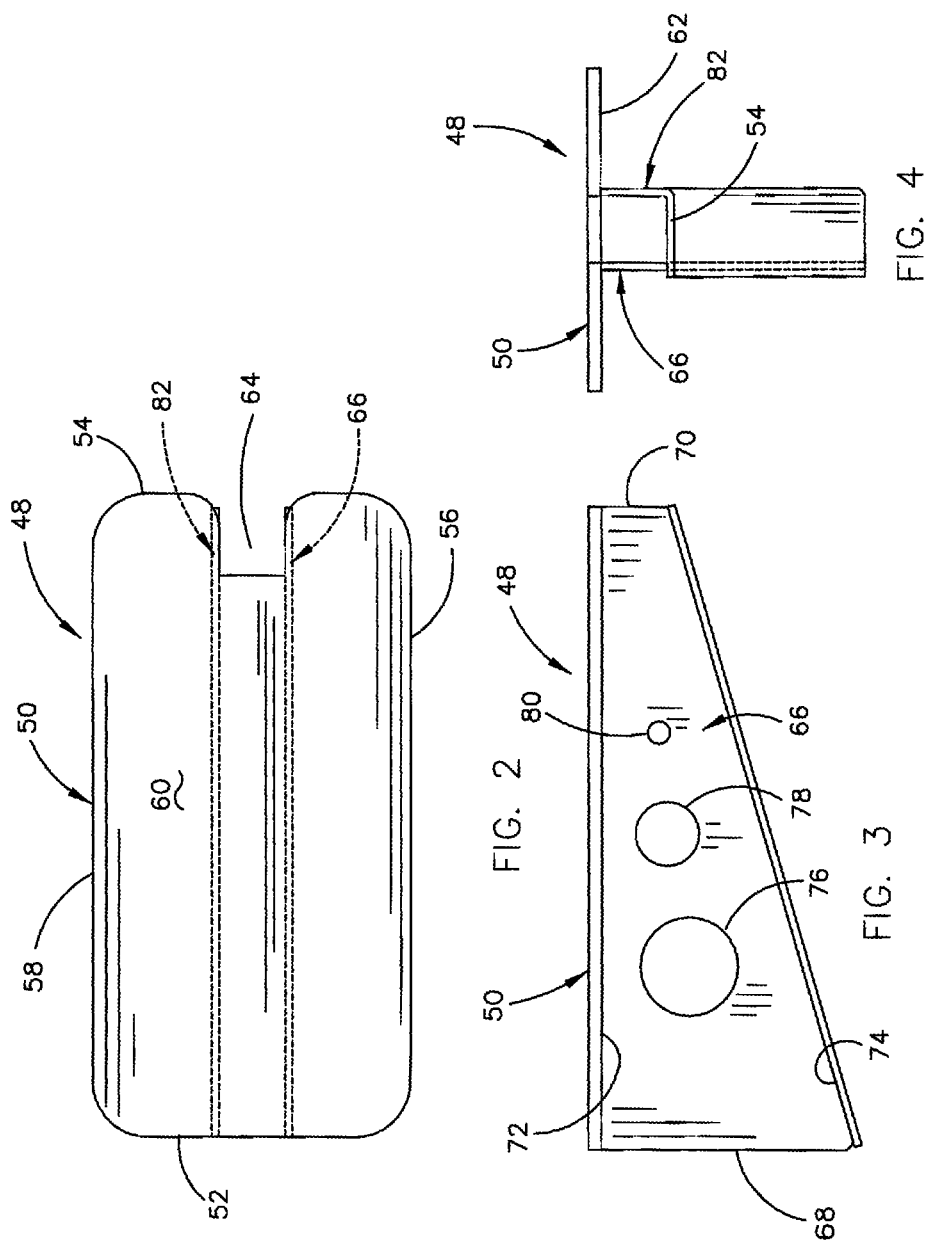

OUTRIGGER PLANK SPLICE SUPPORT

BACKGROUND OF THE INVENTION

Field of the Invention

This invention relates to an outrigger for a trailer and more particularly to an outrigger plank splice support which is mounted on the outrigger to provide a larger horizontally disposed plank support at the upper end of the outrigger.

Description of the Related Art

Over-the-road cargo trailers normally include an elongated wheeled frame means comprising at least a pair of longitudinally extending frame members having a bed or deck positioned thereon and extending therebetween. It is frequently desirable to increase the width of the trailer bed or deck and the prior art has previously provided side extensions for performing that task. The prior art side extensions normally are comprised of a plurality of individual outriggers which may be pivotally moved from a position closely adjacent the outer side of the trailer frame to an extended position wherein the outriggers are substantially transversely disposed with respect to the longitudinal axis of the trailer. The outriggers are designed to support a plank or planks thereon.

One of the earliest patents, to Applicants' knowledge, is U.S. Pat. No. 2,717,802 which is entitled BRACKET FOR FLAT BED TRAILERS and which issued in 1955 to W. E. Martin. The '802 patent discloses a bracket which is fixed to a frame member of a trailer and which has an outrigger pivotally secured to the bracket. The outrigger of the '802 patent has an upstanding retaining flange at the outer end as seen in FIG. 2 of the '802 patent. A plurality of the brackets and outriggers are spaced-apart and have planks or boards supported thereon. The problem with the design of the '802 structure, and the various other prior art brackets and outriggers, is that several planks or boards must be positioned on the outriggers in an end-to-end manner. The abutting ends of the planks or boards must be positioned on the upper end of an outrigger. However, the narrow width of the upper end of the outrigger makes it difficult to properly position the abutting ends of the boards or planks on the upper end of the outrigger. Further, during use or installation, a slight longitudinal movement of one of the boards or planks may result in the end of the board or plank not being supported on the outrigger which may result in a dangerous situation if the cargo supported on the end of the board or plank is no longer being supported on the outrigger.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An outrigger plank splice support for use with an outrigger is disclosed wherein the outrigger extends outwardly from a trailer frame member with the outrigger including a horizontally disposed and elongated upper end member having inner and outer ends, an upstanding lip at the outer end of the upper end member, and an elongated lower end member, having inner and outer ends, which extends inwardly and downwardly from the outer end to its inner end, and a vertically disposed web member, having inner and outer ends, extending between the upper end member and the lower end member. The outrigger plank splice support of this invention includes a horizontally disposed upper support plate having an inner end, an outer end, a first side, a second side, an upper surface and a lower surface. The support of this invention also includes a vertically disposed and generally triangular-shaped first wall member having an inner end, an outer end, an upper end and a lower end. The upper end of the first wall member is secured to the lower surface of the support plate inwardly of the first side thereof and extends vertically downwardly therefrom. The lower end of the first wall member extends upwardly and inwardly from its outer end to its inner end. The support also includes a vertically disposed and generally triangular-shaped second wall member, having an inner end, an outer end, an upper end and a lower end. The upper end of the second wall member is secured to the lower surface of the support plate inwardly of the second side thereof and extends vertically downwardly therefrom. The second wall member is horizontally spaced with respect to the first wall member. The support also includes a bottom wall member which extends between the lower ends of the first and second wall members. The bottom wall member may be integrally formed with the second wall member.

The outrigger plank splice support is configured to be mounted on the outrigger whereby the outrigger is received between the first and second wall members between the upper support plate and above the bottom wall member. The upper support plate is positioned on the horizontally disposed and elongated upper member of the outrigger when the outrigger plank splice support is mounted on the outrigger. The web member, when the outrigger plank splice support is mounted on the outrigger, is positioned between the first and second wall members. The lip on the outrigger, when the outrigger plank splice support is mounted on the outrigger, is positioned at the outer end of the upper support plate. A retaining pin extends through the first side wall, through the web of the outrigger, and through the second side wall when the outrigger plank splice support is mounted on the outrigger to removably secure the outrigger plank splice support on the outrigger.

The width of the upper support plate of the outrigger plank splice support is considerably greater than the width of the upper end member of the outrigger to provide a larger support area for the juncture of a pair of planks.

It is therefore a principal object of the invention to provide an outrigger plank splice support for use with an outrigger of a trailer or the like.

A further object of the invention is to provide an outrigger plank splice support which is mounted on a conventional outrigger extending outwardly from the trailer and which has a support plate at the upper end thereof which increases the width of the upper end of the outrigger to support the ends of a pair of planks thereon.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a top elevational view of the outrigger plank splice support of this invention;

FIG. 3 is a typical side view of the outrigger plank splice support of this invention;

FIG. 4 is an end view of the outrigger plank splice support of this invention;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 9:
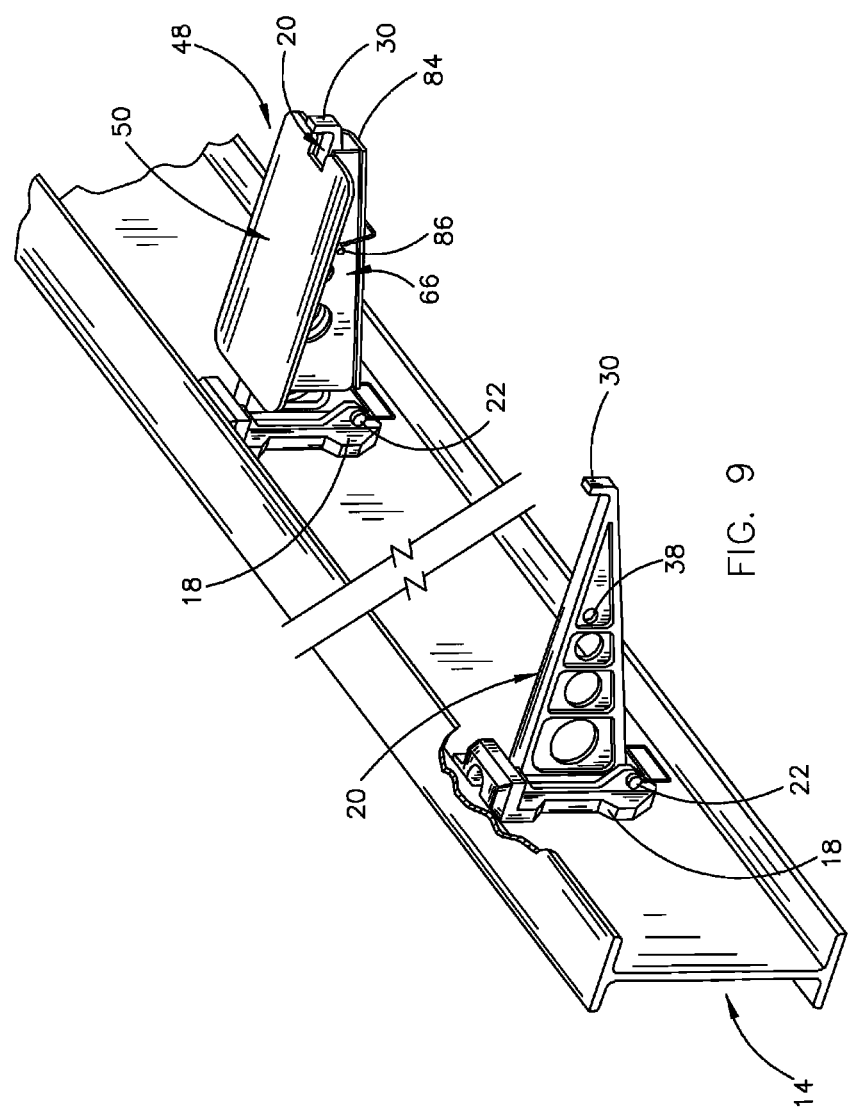
FIG. 9 is a partial perspective view illustrating one of the outriggers of the trailer and which also illustrates the outrigger plank splice support of this invention mounted on another outrigger of the trailer.
Figure 10:
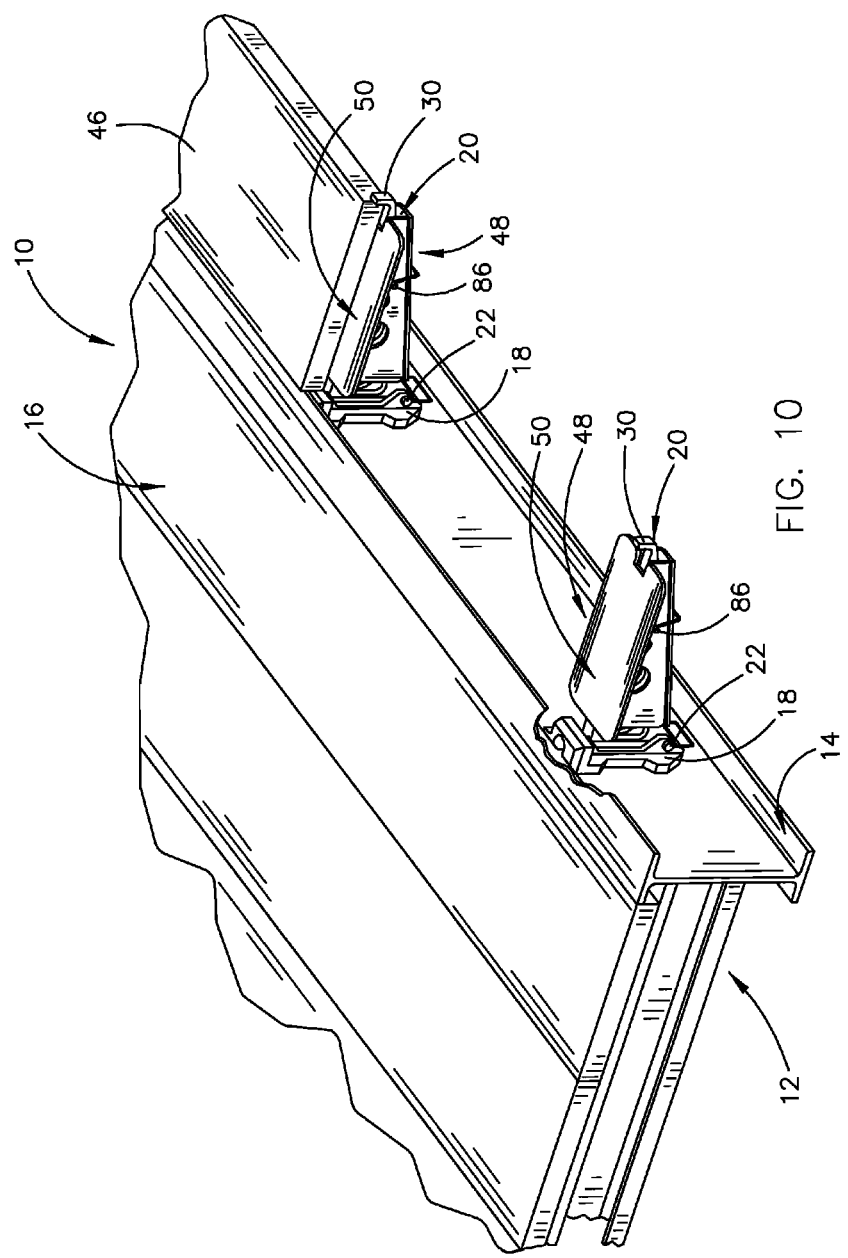
FIG. 10 is a partial perspective view illustrating a pair of the outrigger plank splice supports mounted on a pair of outriggers with a plank being positioned on one of the outrigger plank splice supports.
Figure 11:
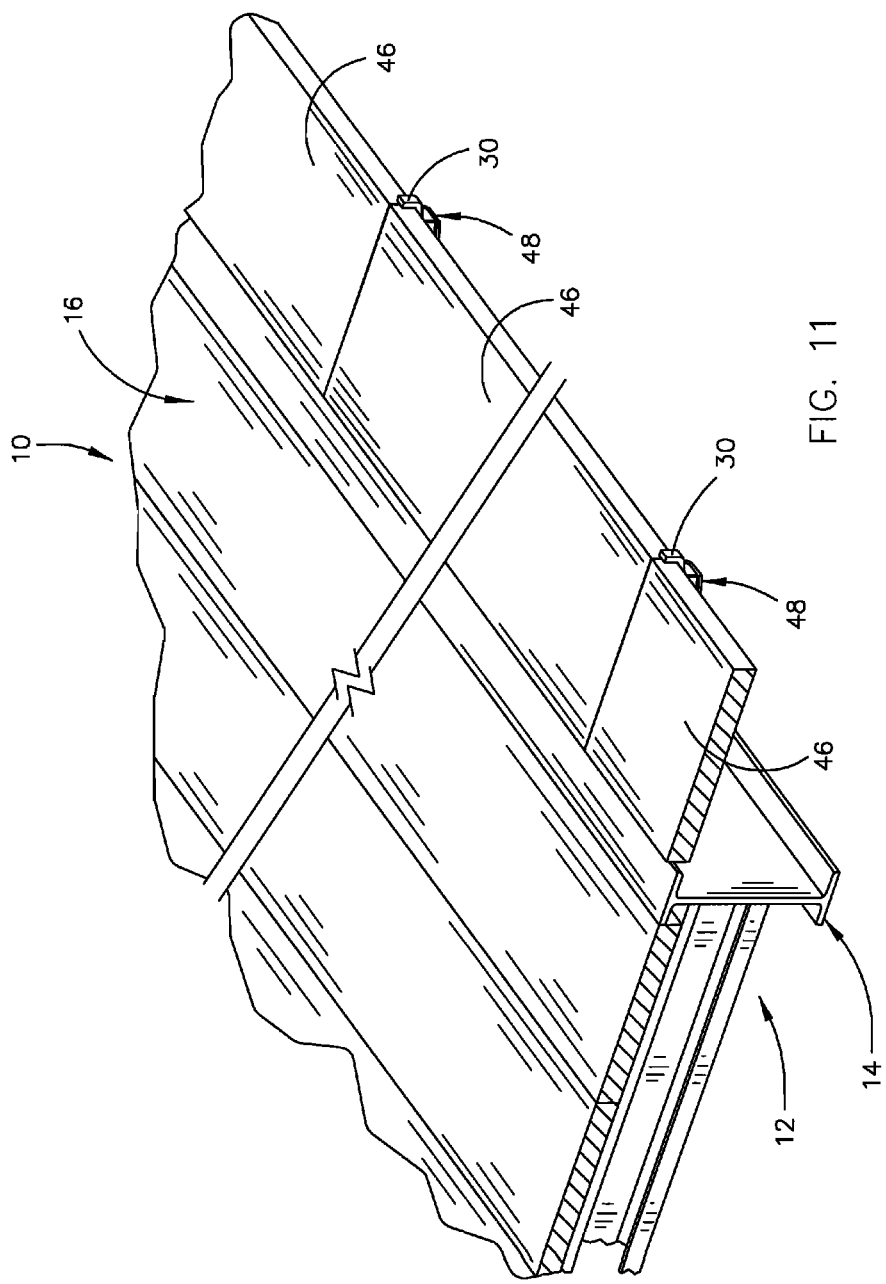
FIG. 11 is a partial perspective view illustrating a plurality of planks mounted on a plurality of outrigger plank splice supports of this invention.
Figure 12:
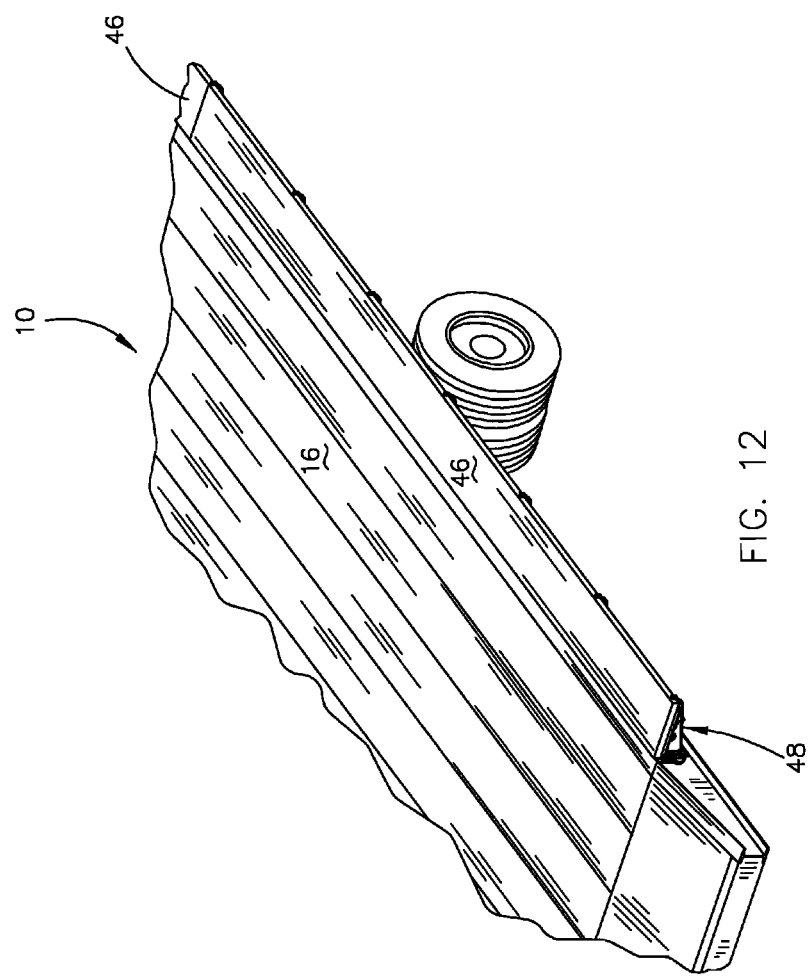
FIG. 12 is a partial rear perspective view of a trailer having a plurality of the outrigger plank splice supports of this invention supporting planks thereon.

The numeral 10 refers to a conventional cargo trailer including a frame means 12 which includes a pair of longitudinally extending frame members 14 having deck 16 supported thereon. The frame members 14 have a plurality of spaced-apart outrigger brackets 18 secured thereto in conventional fashion. Each of the brackets 18 have an outrigger 20 pivotally secured thereto in conventional fashion. The outriggers 20 are pivotally movable with respect to the brackets 18 between a stowed position adjacent the side of frame member to a support position wherein the outriggers extend outwardly from the brackets 18 as seen in FIG. 9, The inner ends of each of the outriggers 20 are selectively removably secured to one of the brackets 18 and held in position by a pin 22. Each of the outriggers 20 includes a support arm 24 having an inner end 26 and an outer end 28. The inner end 26 of support arm 24 is pivotally secured to base portion 22 about a vertical axis. The outer end 28 of support arm 24 has a lip 30 which extends upwardly therefrom to limit the outward movement of a plank positioned thereon.

Support arm 24 includes an upper arm member 32 which is horizontally disposed. Support arm 24 also includes a lower arm member 34 which extends inwardly and downwardly from its outer end to its inner end. Web 36 extends between arm members 32 and 34 and usually has openings 38, 40, 42 and 44 formed therein. The upper side of support arm 32 is flat so as to be able to support a plank 46 thereon.

Normally a plurality of planks 46 will be positioned on the outriggers 20 in an end-to-end manner so as to extend the entire length of the trailer. Inasmuch as the width of the upper arm member 32 is fairly small, it is difficult to position the abutting ends of a pair of planks 46 thereon. If one of the planks 46 moves longitudinally somewhat, the end of that plank will not be supported on the outrigger 20. It is for that reason that the instant invention has been developed.

The outrigger plank splice support (hereinafter "splice support") of this invention is referred to by the reference numeral 48. Splice support 48 includes a horizontally disposed support plate 50 having an inner end 52, an outer end 54, a first side 56, a second side 58, an upper side 60 and a lower side 62. The outer end 54 of support plate 50 has a notch or opening 64 formed therein. Splice support 48 also includes a vertically disposed first side plate 66 having an inner end 68, an outer end 70, an upper end 72 and a lower end 74. Side plate 66 preferably has openings 76, 78 and 80 but openings 76 and 78 may be omitted although they form an alignment means as will be explained hereinafter. The upper end 72 of side plate is welded to the lower side 62 of support plate 50. As seen, side plate 66 is generally triangular in shape.

Figure 1:
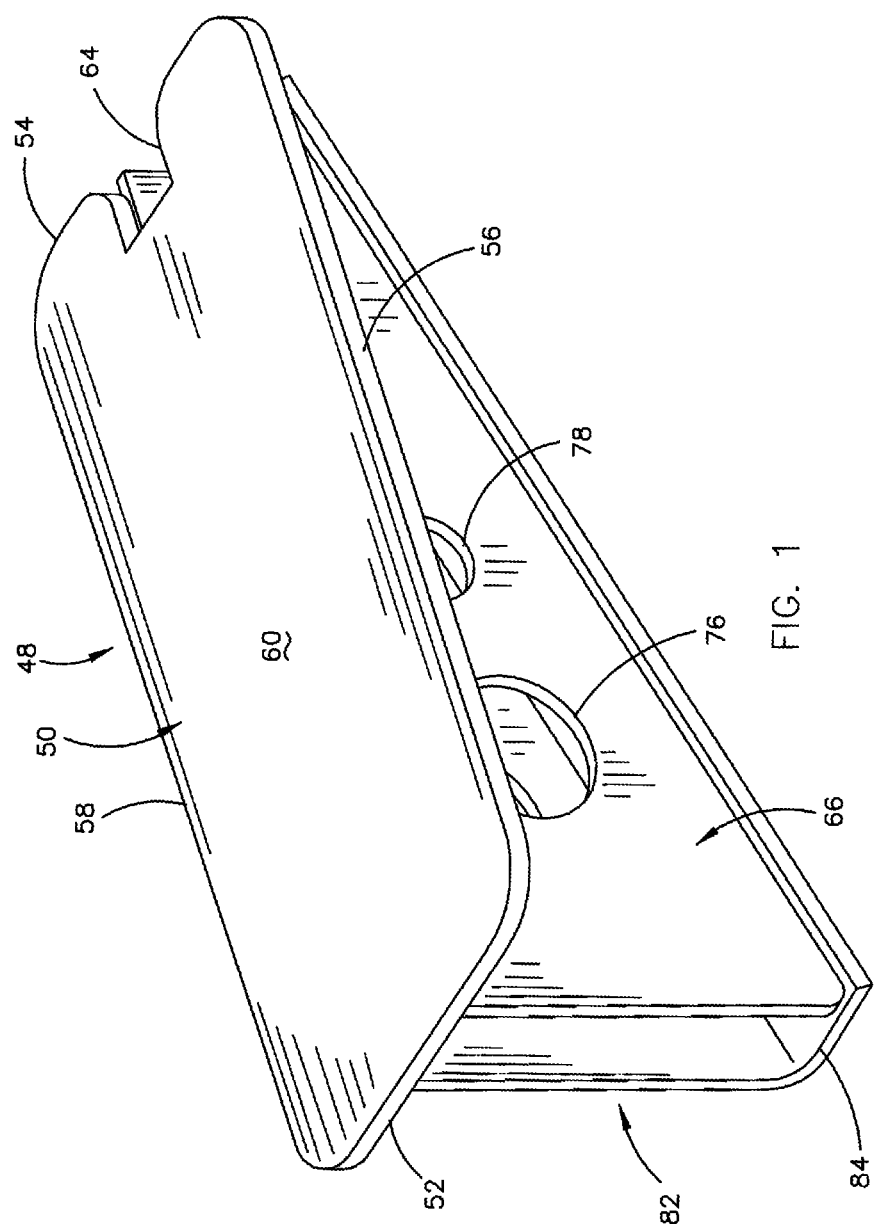
FIG. 1 is an inner perspective view of the outrigger plank splice support of this invention.
Figure 5:
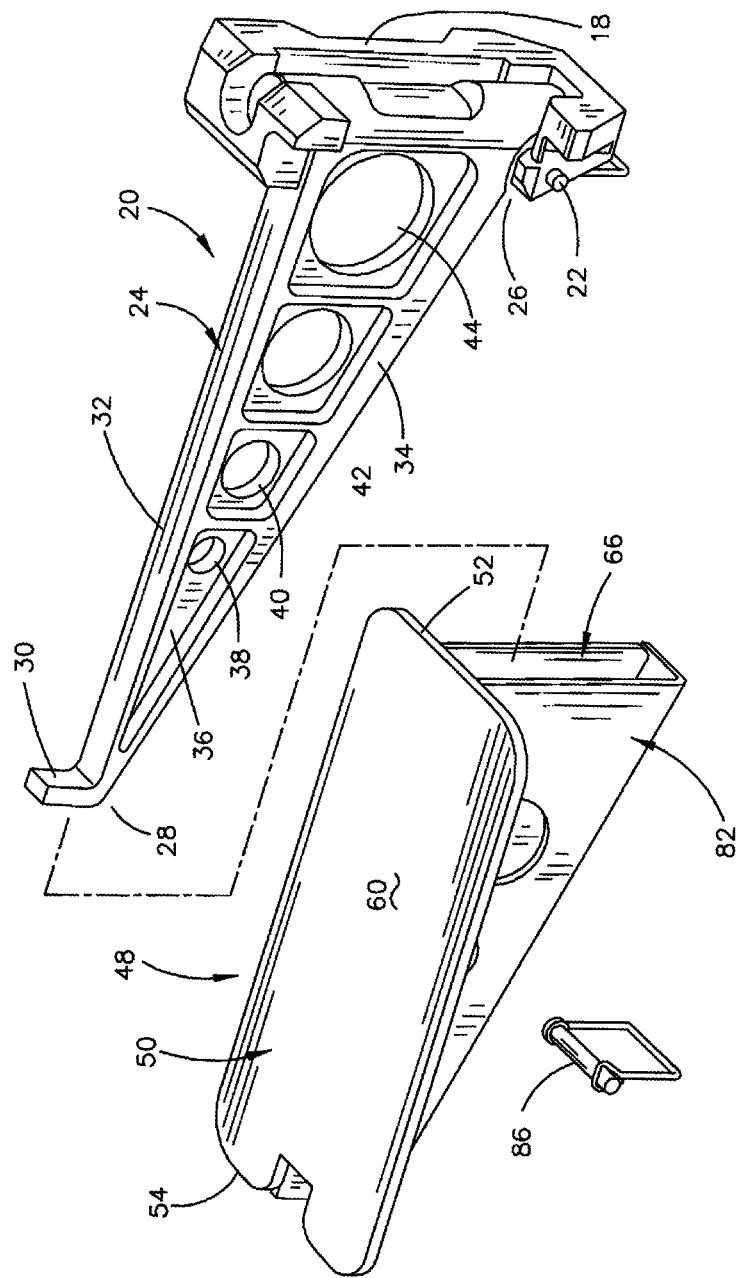
FIG. 5 is an exploded perspective view of the outrigger plank splice support of this invention and an outrigger to which the outrigger plank splice support will be mounted.
Figure 6:
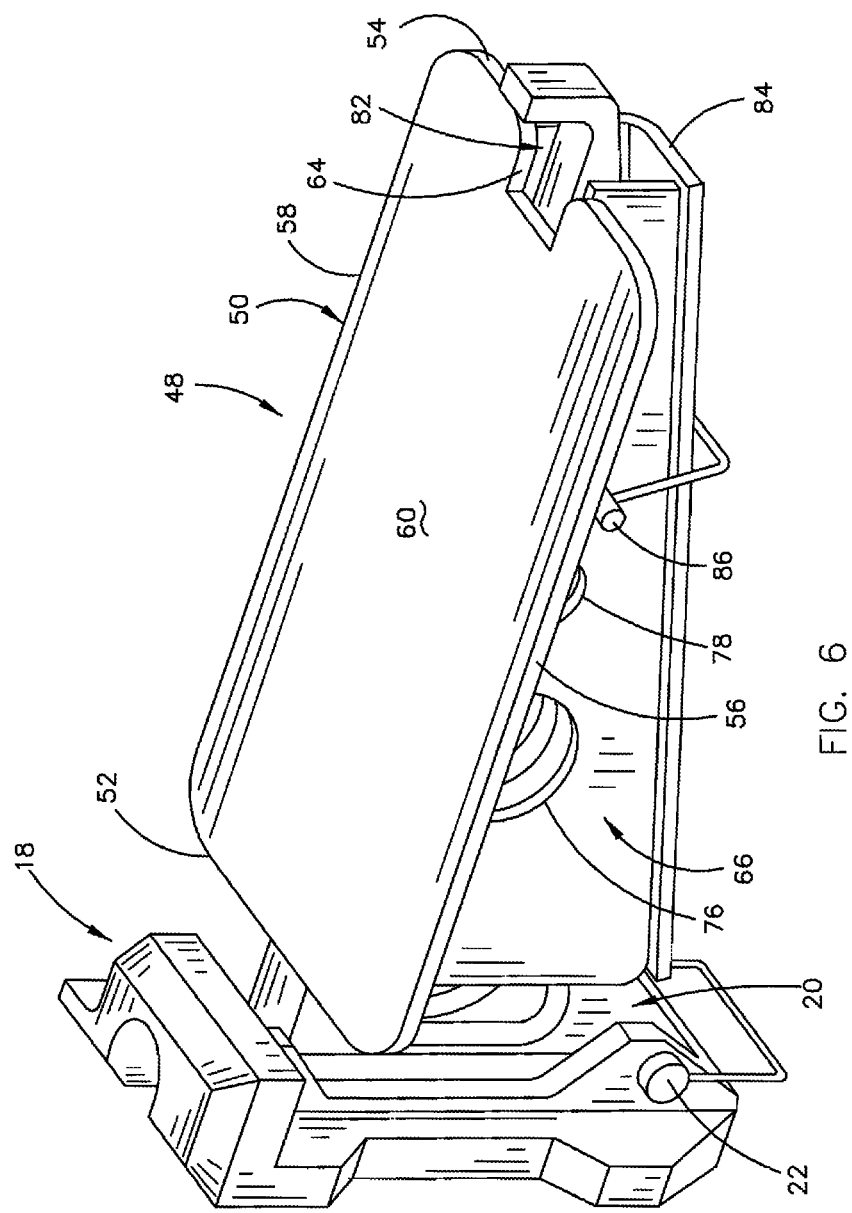
FIG. 6 is a perspective view illustrating the outrigger plank splice support of this invention mounted on an outrigger.
Figure 7:
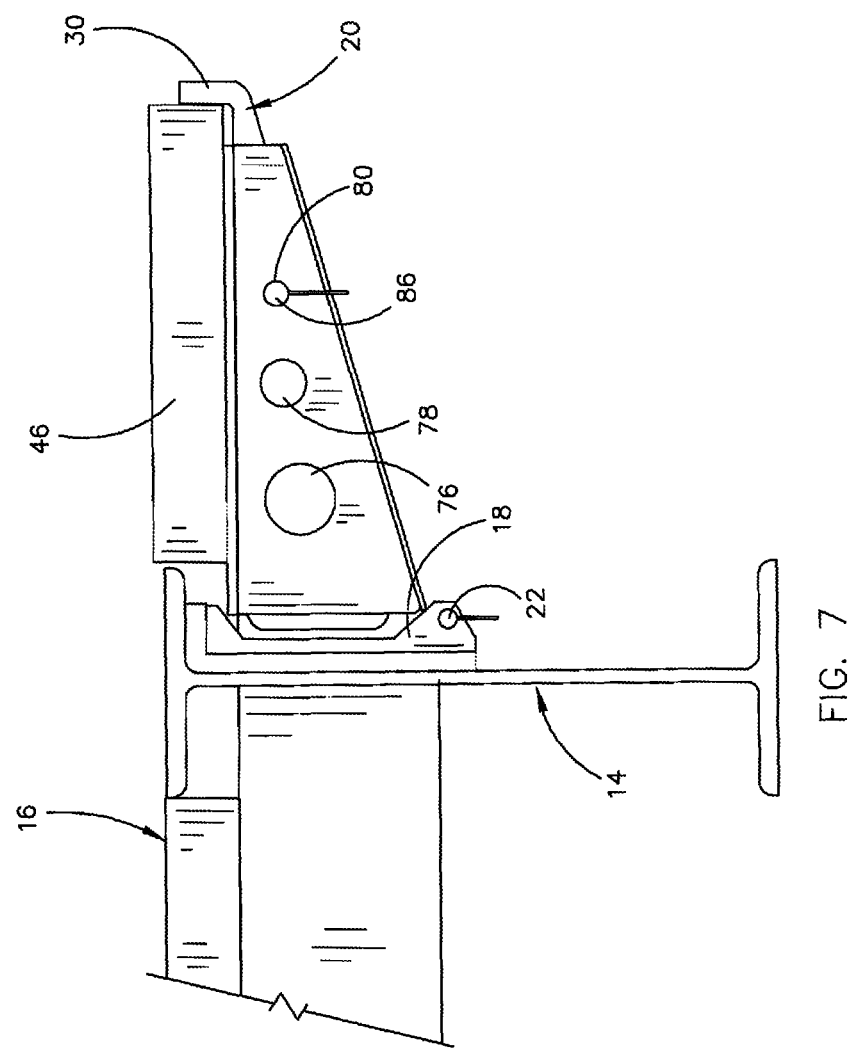
FIG. 7 is a side view illustrating the outrigger plank splice support mounted on an outrigger of a trailer.

Splice support 48 also includes a second side plate 82 which has the same general shape as side plate 66 except for the horizontally disposed lower plate portion 84 which extends inwardly from the lower end of side plate 82 beneath the lower end of side plate 66 as best seen in FIG. 1. Lower plate portion 84 could be a separate piece which would be welded to the lower ends of side plates 66 and 82. Side plate 82 also has openings formed therein which register with openings 76, 78 and 80 formed in side plate 66. The upper end of side plate 82 is welded to the lower side of support plate 50.

The splice support 48 is mounted on an outrigger 20 as will now be described. The outrigger 20 is pivoted with respect to the trailer frame to its outwardly extending position. The splice support 48 is then slipped onto the outer end of the outrigger 20 so that the outrigger 20 is received between side walls 66 and 82 beneath support plate 50 until the openings 76, 78 and 80 of side wall 66 register with the openings 42, 40 and 38. The alignment of those openings is visually determined and made easy by the person viewing the same. A retaining pin 86 is then extended through opening 80 in side plate 66, through opening 38 in web 36 of outrigger 20 and through the opening in side plate 82 which registers with opening 80 in side plate 66.

Figure 8:
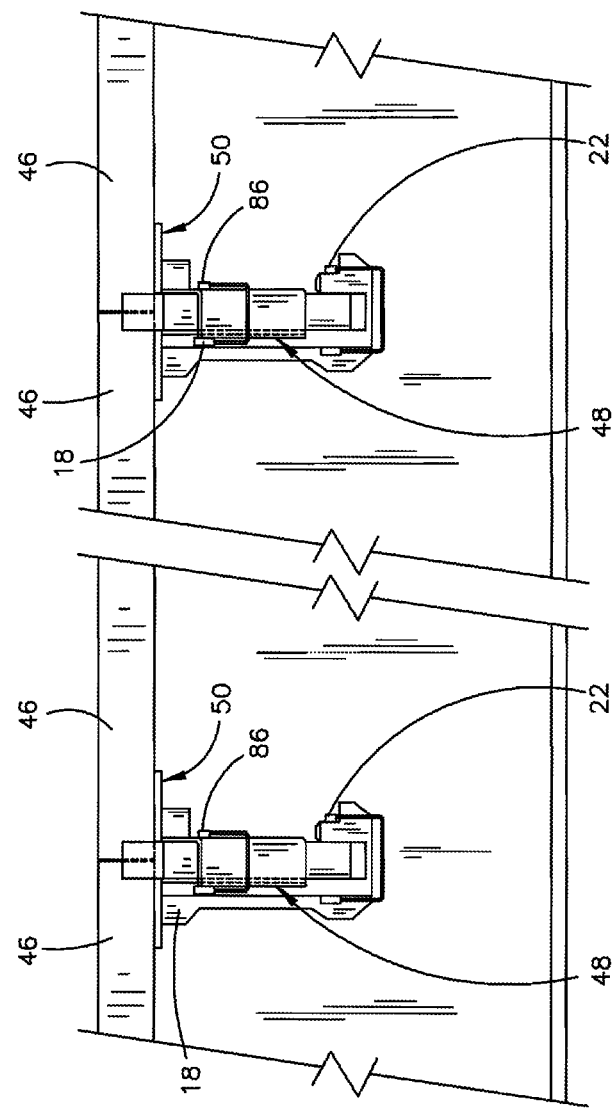
FIG. 8 is a partial side elevational view of a trailer having the outrigger plank splice supports of this invention mounted on a pair of outriggers.

As seen, the width of the support plate 50 is much greater than the width of the upper arm member 32. The support plate 50 easily supports the abutting ends of a pair of planks 46 as seen in FIG. 8. Should one of the planks 46 move away from the outrigger 20 somewhat, it will still be supported on the support plate 50. Further, the splice support 48 is easily mounted on the outrigger 20 and is easily removed therefrom.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A plank splice support for use with an outrigger which extends outwardly from a trailer frame member with the outrigger including a horizontally disposed and elongated upper end member having inner and outer ends, an upstanding lip at the outer end of the upper end member, an elongated lower end member, having inner and outer ends, which extends inwardly and downwardly from its outer end to its inner end, and a vertically disposed web member, having inner and outer ends, extending between said upper end member and said lower end member; comprising:

a horizontally disposed support plate having an inner end, an outer end, a first side, a second side, an upper surface and a lower surface;

a vertically disposed and generally triangular-shaped first wall member having an inner end, an outer end, an upper end and a lower end;

said upper end of first wall member being secured to said lower surface of said support plate at said first side thereof and extending vertically downwardly therefrom;

said lower end of said first wall member extending downwardly and inwardly from its said outer end to its said inner end;

a vertically disposed and generally triangular-shaped second wall member having an inner end, an outer end, an upper end and a lower end;

said upper end of said second wall member being secured to said lower surface of said support plate at said second side thereof and extending vertically downwardly therefrom;

said second wall member being horizontally spaced with respect to said first wall member;

said lower end of said second wall member extending downwardly from its said outer end to its said inner end;

a bottom wall member extending between said lower ends of said first and second wall members;

said plank splice support configured to be mounted on the outrigger whereby the outrigger is received between said first and second wall members between said support plate and above said bottom wall member;

said support plate being positioned on the horizontally disposed and elongated upper end member of the outrigger when said plank splice support is mounted on the outrigger;

the web member, when said plank splice support is mounted on the outrigger, being positioned between said first and second wall members;

the lip on the outrigger, when said plank splice support is mounted on the outrigger, being positioned at said outer end of said support plate;

and a retaining pin extending through said first side wall member, through the web of the outrigger, and through said second side wall member when said plank splice support is mounted on the outrigger to selectively removably secure said plank splice support on the outrigger.

2. The plank splice support of claim 1 wherein said support plate has a greater width than the width of the upper end member of the outrigger.

3. The plank splice support of claim 1 wherein the web member has a pin opening formed therein which receives said retaining pin extending therethrough.

4. A device for use with an outrigger which extends outwardly from a trailer frame member with the outrigger including a horizontally disposed and elongated upper end member having an inner end, an outer end, an upper end and a lower end, an upstanding lip at the outer end of the upper end member, an elongated lower end member, having an inner end, an outer end, an upper end and a lower end, which extends inwardly and downwardly from its outer end to its inner end, and a vertically disposed web member, having an inner end, an outer end, a first side and a second side, extending between said upper end member and said lower end member; comprising:

a plank splice support configured to be mounted on the outrigger;

said plank splice support including a horizontally disposed and generally rectangular-shaped support plate having an inner end, an outer end, a first side, a second side, an upper surface, a lower surface, a length and a width and a channel shaped member depending from the support plate;

said support plate being positioned on and supported by the upper end member of the outrigger when said plank splice support is mounted on the outrigger;

said width of said support plate being greater than the width of the upper end member of the outrigger; and said plank splice support embracing the upper end of the horizontally disposed upper end member, the lower end of the lower end member and the first and second sides of the web member when said plank splice support is mounted on the outrigger.

* * * * *